(No Model.) 2 Sheets—Sheet 1.
W. C. RANNEY.
BRAKE FOR VELOCIPEDES.
No. 581,038. Patented Apr. 20, 1897.
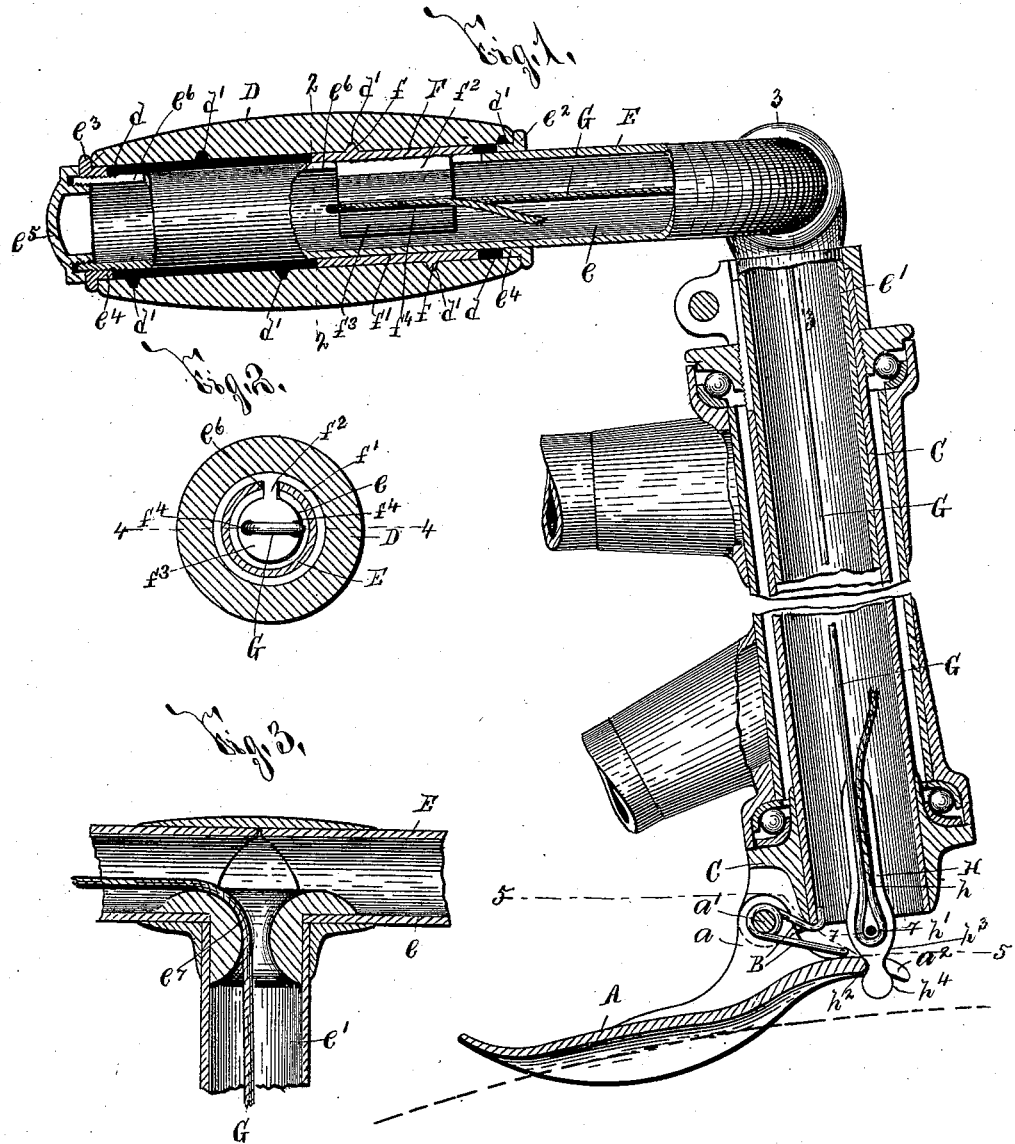
WITNESSES:
INVENTOR
William C. Ranney,
BY
Hey & Parsons
ATTORNEYS.

(No Model.) 2 Sheets—Sheet 2.

W. C. RANNEY.
BRAKE FOR VELOCIPEDES.

No. 581,038. Patented Apr. 20, 1897.

WITNESSES:
H. E. Chase,
H. H. Thebald.

INVENTOR
William C. Ranney,
BY
Hoyt & Parsons
ATTORNEYS.

UNITED STATES PATENT OFFICE.

WILLIAM C. RANNEY, OF ELBRIDGE, NEW YORK.

BRAKE FOR VELOCIPEDES.

SPECIFICATION forming part of Letters Patent No. 581,038, dated April 20, 1897.

Application filed July 18, 1895. Serial No. 556,353. (No model.)

*To all whom it may concern:*

Be it known that I, WILLIAM C. RANNEY, of Elbridge, in the county of Onondaga, in the State of New York, have invented new and useful Improvements in Brakes for Velocipedes, of which the following, taken in connection with the accompanying drawings, is a full, clear, and exact description.

My invention relates to improvements in brakes particularly applicable for use with bicycles and other velocipedes, and has for its object the production of a device which is extremely light and efficient and is easily operated; and to this end it consists, essentially, in the construction of the component parts of the brake, all as hereinafter fully described, and pointed out in the claims.

In describing this invention reference is had to the accompanying drawings, forming a part of this specification, in which like letters indicate corresponding parts in all the views.

Figure 4:
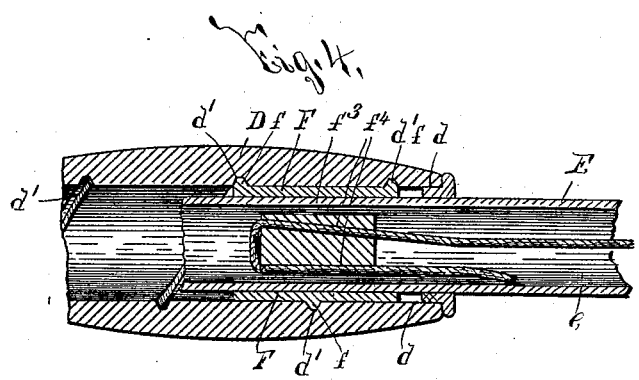
Figure 5:
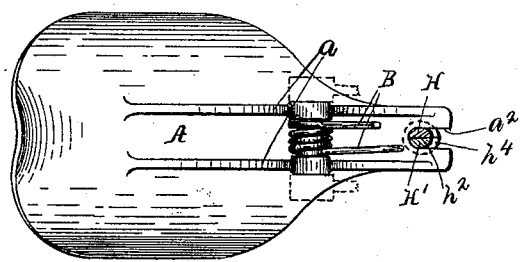
Figure 6:
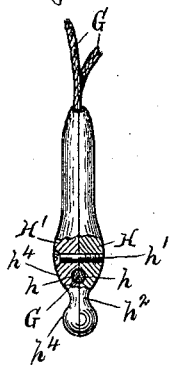
Figure 7:
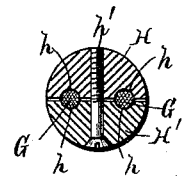

Figure 1 is a vertical section, partly in elevation, of the head and handle-bar of a bicycle provided with my improved brake. Figs. 2 and 3 are detail vertical sections taken, respectively, on lines 2 2 and 3 3, Fig. 1. Figs. 4 and 5 are horizontal sections taken, respectively, on lines 4 4, Fig. 2, and 5 5, Fig. 1. Fig. 6 is an elevation, partly in section, of the clamping-plates engaged with the brake-shoe; and Fig. 7 is a transverse section taken on line 7 7, Fig. 1.

A is the brake-shoe, and B a suitable spring for holding the same in its inoperative position, and, as is obvious, both of these parts may be of any desirable form, size, and construction. Two ears $a$ $a$ project from the upper face of the shoe A between its opposite extremities and are pivoted at $a'$ to the head C of a bicycle or velocipede of any desirable construction provided with my invention. The rear end of the shoe A engages the outer peripheral face (indicated by the dotted line 1, Fig. 1) of a wheel-tire, (not illustrated,) and its front end is provided with an aperture $a^2$, which preferably consists of a slot extending inwardly from its front edge. The shoe A is preferably forced into operative position against the action of the spring B by a handpiece D, presently described, but, if desired, the rider's foot may be utilized to actuate said shoe.

The handpiece D is loosely mounted on the handle-bar E, which is formed with an internal chamber $e$ and is provided with a hollow standard $e'$, preferably journaled in the head C and having its lower end open and arranged above the front end of the shoe A. Endwise movement of the handpiece D is prevented by annular projecting shoulders $e^2$ $e^3$, secured to the handle-bar E and engaged with the opposite ends of the handpiece. The shoulders $e^2$ $e^3$ are preferably provided upon the opposite ends of the collars $e^4$, which encircle the handle-bar and project within the handpiece D for forming a bearing therefor. The outer collar $e^4$ is adjustable lengthwise of the handle-bar E and is preferably engaged and held in position by an adjustable and removable plug $e^5$, which closes the outer end of said handle-bar and is provided with an exteriorly-threaded flange screwing within said handle-bar.

The inner peripheral face $d$ of the handpiece D is of greater diameter than the handle-bar and is provided with threads $d'$, which are engaged by threads $f$ upon the outer face of an operating-piece F, movable lengthwise of said handpiece and handle-bar. The operating-piece F preferably consists of an outer ring $f'$, arranged within the handpiece and encircling the handle-bar, and an inwardly-projecting arm $f^2$, which projects into the interior of the adjacent portion of the handle-bar through a longitudinal slot $e^6$ therein.

The revoluble movement of the handpeice D moves the operating-piece F lengthwise of the handle-bar by means of the threads $d$ $f$, and connections between said operating-piece and the brake-shoe A force the shoe against the action of the spring B into operative position.

It is obvious that various means may be used for connecting the operating-piece to the brake-shoe, but I preferably use a flexible cord G, formed of wire or other suitable material and having its central portion passed over a rounding engaging face $e^7$, supported within the handle-bar at substantially the point of union of the standard $e'$ with said handle-bar. The opposite ends of the cord G may be permanently secured to the operating-piece and the brake-shoe, but as the length and adjustment of the handle-bar vary I so secure said cord that its length may be adjusted at either end.

The upper end of the cord G is passed through two substantially parallel perforations $f^4$ in the inner or free extremity $f^3$ of the arm $f^2$ of the operating-piece F and may be readily adjusted in said perforations. The lower end of the cord G is movable through grooves $h$, formed in the adjacent faces of clamping-plates H, which are firmly secured together by a clamping-bolt $h'$ for holding the cord G in its adjusted position. The grooves $h$ extend downwardly from the upper ends of the clamping-plates, and the lower ends of said plates are detachably engaged with the front end of the shoe A, and are formed with contracted necks $h^2$ for entering the groove $a^2$ and rounding upper and lower shoulders $h^3$ $h^4$ for engaging the upper and lower faces of the adjacent portion of said brake-shoe.

In addition to its use as a brake my invention is also applicable for locking the front wheel from movement when the bicycle or velocipede is not in use and is supported by an upright wall.

The operation of my brake for velocipedes will be readily understood upon reference to the foregoing description and the accompanying drawings, and as it is obvious that the exact detail construction and arrangement of its component parts may be somewhat varied without departing from the spirit of my invention I do not herein specifically limit myself to such exact detail construction and arrangement.

Having thus fully described my invention, what I claim as new, and desire to secure by Letters Patent, is—

1. In a brake for bicycles, the combination with a movable brake-shoe, a hollow handle-bar provided with a lengthwise slot in one end and having a hollow standard, and a flexible connection passed through the handle-bar and standard and connected to the brake-shoe; of collars $e^4$ encircling the slotted end of the handle-bar, one of the collars being adjustable toward and away from the other and the outer ends of said collars being provided with annular projecting shoulders $e^2$ $e^3$, a handpiece D revoluble on the slotted end of the handle-bar and having its opposite ends mounted on the collars $e^4$ between the shoulders $e^2$ $e^3$, the inner peripheral face of the handpiece being threaded and separated from the adjacent portion of the peripheral face of said slotted end of the handle-bar, and an operating-piece F comprising an outer ring $f'$ encircling said slotted end of the handle-bar and having its outer peripheral face provided with threads engaged with the threads of the inner peripheral face of the handpiece, and an inwardly-extending arm $f^2$ movable in the slot of said end of the handle-bar and having its inner extremity $f^3$ adjustably connected to the flexible connection, substantially as and for the purpose specified.

2. In a brake for bicycles, the combination with a movable brake-shoe, a hollow handle-bar provided with a lengthwise slot in one end and having a hollow standard, and a flexible connection passed through the handle-bar and standard and connected to the brake-shoe; of collars $e^4$ encircling the slotted end of the handle-bar, the outer one of the collars being adjustable toward and away from the other and the outer ends of said collars being provided with annular projecting shoulders $e^2$ $e^3$, a handpiece D revoluble on the slotted end of the handle-bar and having its opposite ends mounted on the collars $e^4$ between the shoulders $e^2$ $e^3$, the inner peripheral face of the handpiece being threaded and separated from the adjacent portion of the peripheral face of said slotted end of the handle-bar, a plug $e^5$ for closing the outer extremity of the slotted end of the handle-bar, said plug being engaged with said outer adjustable collar and having an exteriorly-threaded flange screwing within the handle-bar, and an operating-piece comprising an outer ring $f'$ encircling said slotted end of the handle-bar, and engaged with the threads of the inner peripheral face of the handpiece, and an inwardly-extending arm $f^2$ movable in the slot of said end of the handle-bar and having its inner extremity connected to the flexible connection, substantially as and for the purpose described.

3. In a brake for velocipedes, the combination of a brake-shoe formed with an aperture therein, opposite clamping-plates having their inner faces provided with grooves extending downwardly from their upper ends and their lower ends formed with contracted necks for entering said aperture, and upper and lower shoulders for engaging the adjacent portion of the brake-shoe, a clamping-bolt for securing said plates together, a movable handpiece, and a connection having one end arranged in the grooves of the clamping-plates and its opposite end connected to the handpiece, substantially as specified.

In testimony whereof I have hereunto signed my name, in the presence of two attesting witnesses, at Syracuse, in the county of Onondaga, in the State of New York, this 5th day of July, 1895.

WILLIAM C. RANNEY.

Witnesses:
    E. A. WEISBURG,
    H. E. CHASE.